(12) United States Patent
Ilmonen (10) Patent No.: US 7,270,536 B2
(45) Date of Patent: Sep. 18, 2007

(54) SCREW TIP AND MOLDING SYSTEM APPARATUS

(75) Inventor: Robert Ilmonen, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 265 days.

(21) Appl. No.: 10/844,456

(22) Filed: May 13, 2004

(65) Prior Publication Data

US 2005/0255188 A1  Nov. 17, 2005

(51) Int. Cl.
*B29C 39/24* (2006.01)
(52) U.S. Cl. .................. 425/559; 425/562; 425/563
(58) Field of Classification Search .............. 425/559, 425/562, 563
See application file for complete search history.

(56) References Cited

U.S. PATENT DOCUMENTS

| | | | | |
|---|---|---|---|---|
| 2,885,734 A | | 5/1959 | Wucher | |
| 3,659,996 A | * | 5/1972 | Schwarz et al. | 425/563 |
| 3,689,184 A | * | 9/1972 | Morse | 100/148 |
| 3,895,747 A | * | 7/1975 | Aoki | 222/494 |
| 4,472,058 A | * | 9/1984 | Pirro | 366/78 |
| 6,113,380 A | * | 9/2000 | Hara | 425/559 |
| 6,435,853 B1 | * | 8/2002 | Teraoka et al. | 425/4 C |
| 6,499,987 B1 | * | 12/2002 | Durina et al. | 425/192 R |
| 6,921,190 B2 | * | 7/2005 | Albrecht et al. | 366/78 |

FOREIGN PATENT DOCUMENTS

| CA | 2070425 | 7/1992 |
|---|---|---|
| CA | 2103068 C | 11/1992 |

* cited by examiner

*Primary Examiner*—Tim Heitbrink
*Assistant Examiner*—Joseph Leyson (57) ABSTRACT

A screw tip for use in a molding system apparatus is disclosed. The screw tip includes a connection section and screw tip head section. The screw tip head houses an entry port, or entry ports, an accumulation chamber, and a check valve chamber. A check valve is provided when assembled with the screw tip. The check valve may be a cylindrical plate or a spherical member or a conical member.

12 Claims, 5 Drawing Sheets

SCREW TIP AND MOLDING SYSTEM APPARATUS

BACKGROUND OF INVENTION

1. Field of the Invention

The present invention is directed to a screw tip, and more particularly to a screw tip for controlling the flow of a melt of material in a barrel of a molding system apparatus. For example, the molding system apparatus may be for a plastic injection molding system, or a metal injection molding system for molding a metal in a thixotropic state, or a die casting molding system.

2. Background Information

Screw tip assemblies forming a check valve mounted on the end of a screw are known in the art. For example, U.S. Pat. No. 2,885,734 issued to Wucher on May 12, 1959. The specification illustrates a two part check valve. A diffuser head is formed by a circular disk member that is mounted into an end of a screw. The disk includes a plurality of semi-circular openings around the peripheral edge of the disk. Portions of the disk intermediate the semi-circular openings extend outwardly and engage a inside cylindrical wall of the barrel to provide a seal and support for an end of the screw when located in a barrel. The semi-circular openings cooperate with the inside cylindrical wall of the barrel to form channels that permit a flow of melted material to pass from an upstream side of the diffuser head to a downstream side of the diffuser head. A non-return valve is formed by a second disk member that is mounted on the downstream side of the diffuser head by a threaded bolt. The second disk includes a plurality of circular openings about the face of the disk. The circular openings permit a flow of melted material to pass when spaced apart from the diffuser head, and stop a flow of melted material when engaged with the diffuser head. The circular peripheral edge of the second disk engages the inside cylindrical wall of the barrel to provide a seal and support for the end of the screw in the barrel.

There are a number of problems with the prior art device. The flow path through the check valve includes a number of sharp corners that will shear the melt. The flow path also includes a number of areas that trap melt which in turn leads to degradation of the melt. The screw is supported by the peripheral edge of the check valve and diffuser engaging the inside cylindrical wall of the barrel causing stress and wear of the check valve. The outside surface of the check valve and inside surface of the opening surrounding the threaded bolt in the non-return valve are prone to wear.

Therefore, there is a need for an improved screw tip and check valve

SUMMARY OF INVENTION

The present invention has many advantages. The check valve is simpler to manufacture and assemble within the check valve chamber. Movement of the check valve between the flow position and the flow cut off position is damped due to a melt of material, in operation, behind the check valve and in the narrow flow channels of the entry ports. The three pin support of the check valve is simpler to manufacture and assemble in the screw tip head. Machining of the screw tip head is simplified. The screw tip is capable of better withstanding shock energy during injection. Wear between the check valve and the barrel is reduced.

In a first broad aspect of the invention, the invention is directed to a screw tip for use in a molding system apparatus. The screw tip comprises a body, an entry port in the body, and a check valve chamber in the body. The check valve chamber communicating with the entry port to provide a flow path. The check valve chamber having a surface for engaging, in use, a translatable member operable between a flow position and a shut off position. The check valve chamber in the end of the body is operable in use to control a flow of material.

In another broad aspect of the invention, the invention is directed to a molding system apparatus. The apparatus comprises an elongate screw, a screw tip body, an entry port in the body, and a check valve chamber in the body. The check valve chamber communicating with the entry port to provide a flow path. The check valve chamber having a surface for engaging, in use, a translatable member operable between a flow position and a shut off position. The check valve chamber in the end of the body is operable in use to control a flow of material.

In another broad aspect of the invention, the invention is directed to a molding system apparatus. The apparatus comprises a barrel, an elongate screw, the elongate screw disposed in the barrel and operable, in use, to rotate and translate, a screw tip body, the screw tip body disposed on an end of the elongate screw, and entry port in the body, and a check valve chamber in the body. The check valve chamber communicating with the entry port to provide a flow path. The check valve chamber having a surface for engaging, in use, a translatable member operable between a flow position and a shut off position. The check valve chamber in the end of the body is operable in use to control a flow of material.

In an alternate embodiment of the invention, the screw tip includes a plurality of entry ports in the body. The check valve chamber is central in the body about an axis and the plurality of entry ports in the body communicate with the check valve chamber. In a preferred embodiment of the invention, the plurality of entry ports are six equally spaced about a chamfer of the body.

In an embodiment of the invention, the screw tip includes a translatable member positioned in the check valve chamber about the axis.

In an embodiment of the invention, the translatable member includes a sealing surface and the check valve chamber includes a sealing surface. In the shut off position, the sealing surface of the translatable member engages the sealing surface of the check valve chamber preventing, in use, a flow of material.

In an embodiment of the invention, the screw tip includes a support guide. The support guide cooperating with the body and the translatable member to position the translatable member in the check valve chamber about the axis and permit the translatable member to operate, in use, between the flow position and the shut off position. In a preferred embodiment of the invention, the support guide is three pins equally spaced about a circumference of the check valve chamber. The pins engaging a sidewall area of the translatable member to support and guide movement, in use, of the translatable member.

In an embodiment of the invention, the screw tip includes a stop member. The stop member cooperating with the body and the translatable member to limit travel, in use, of the translatable member in the flow position. In a preferred embodiment of the invention, the stop member is a pair of pins equally spaced apart from each other in the check valve chamber for engaging, in use, a surface of the translatable member.

In a preferred embodiment of the invention, the translatable member is a cylindrical plate. In an alternate embodiment of the invention, the translatable member is spherical. In another alternate embodiment of the invention, the translatable member is substantially cylindrical. In another alternate embodiment of the invention, the translatable member is substantially spherical. In another alternate embodiment of the invention, the translatable member is substantially conical.

In an embodiment of the invention, the screw tip includes an accumulator chamber. The accumulator chamber intermediate the entry port and the check valve chamber for transferring, in use, a flow of melt from the entry port to the check valve chamber. In an alternate embodiment of the invention, the entry port connects directly to the check valve chamber.

In an embodiment of the invention, the screw tip includes an engagement member for securing the screw tip to a complimentary engagement member of a screw. In another embodiment of the invention, the screw tip is integrally formed on an end of a screw.

In an embodiment of the invention, the check valve chamber includes a substantially cylindrical sidewall and the translatable member is a substantially cylindrical disk. A diameter of the cylindrical disk is smaller than a diameter of the substantially cylindrical sidewall.

In an alternate embodiment of the invention, the check valve member includes a chamfer portion. The translatable member is substantially spherical. A diameter of the translatable member engages the chamfer portion in the stop flow position. In another alternate embodiment of the invention, the check valve chamber includes a conical portion, the translatable member is substantially conical, and a conical section of the translatable member engages, in use, the conical portion in the stop flow position.

BRIEF DESCRIPTION OF DRAWINGS

Exemplary embodiments of the present invention will now be described with reference to the accompanying drawings, in which.

DETAILED DESCRIPTION

Figure 1:
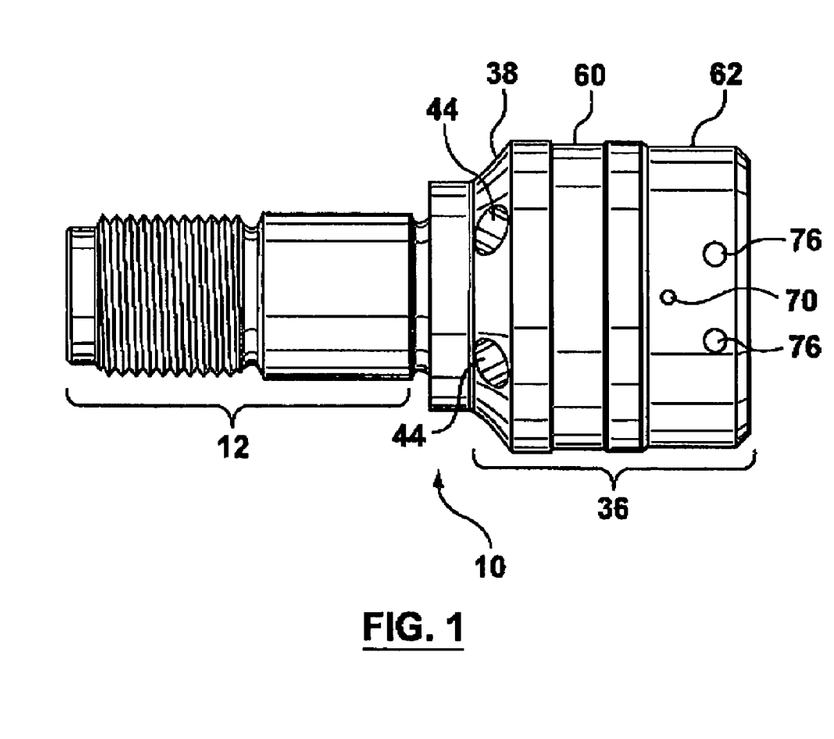
FIG. 1 is a diagrammatic side view of the screw tip.
Figure 2:
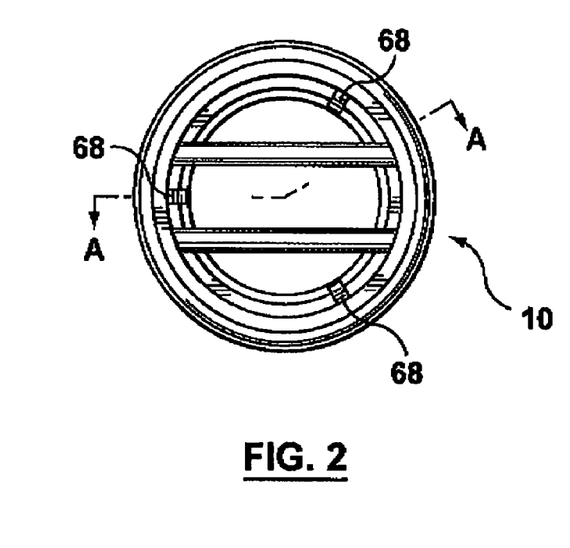
FIG. 2 is a diagrammatic end view of the screw tip the exit port end.

The present invention is described in accordance with an embodiment as illustrated with reference to FIGS. 1 and 2. A screw tip is illustrated generally at 10. The screw tip 10 includes a connection 12 section and a screw tip head 36 section. The connection 12 is for mounting and retaining the screw tip 10 with a screw (not shown). The screw tip head 36 houses the entry port 44 (or entry ports), central accumulator chamber 46, and check valve chamber 48 (see FIG. 3). The screw tip head 36 also houses a check valve 64 upon assembly.

Figure 3:
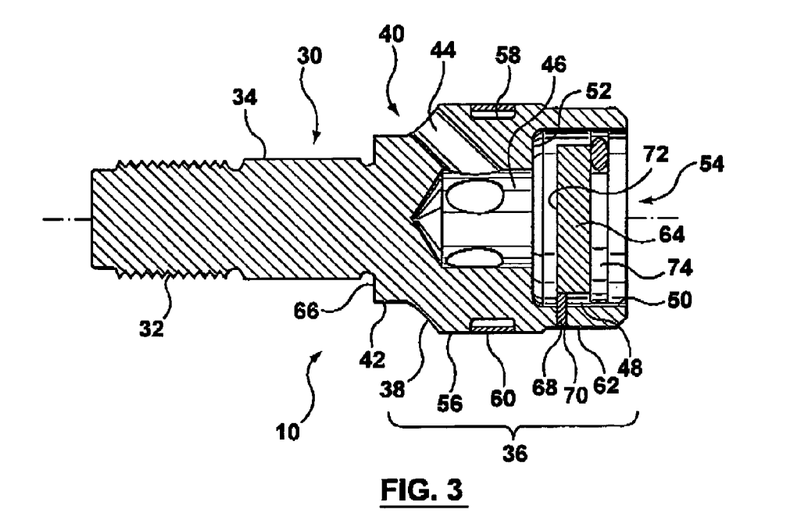
FIG. 3 is a diagrammatic cross sectional view of the screw tip taken along the line A-A from FIG. 2 illustrating the preferred embodiment for the check valve.

The connection 12 and the screw tip head 36 of the invention are further described with reference to the cross sectional view illustrated in FIG. 3 which is taken along the line A-A of FIG. 2. The connection 12 has a substantially cylindrical body. The connection 12 has an engagement member 32, for example threads formed about a diameter of a cylindrical end. The engagement member 32 cooperates with complimentary threads in a cylindrical bore located in the end of a screw (not shown) to secure and release the screw tip from the screw.

In an embodiment of the invention, the connection 12 also includes, adjacent the engagement member 32, an optional guide member 34 formed on another cylindrical portion of the connection 12. The diameter of the engagement member 32 is smaller than the diameter of the guide member 34. The guide member provides alignment of the screw tip 10 with the barrel 16 about a central longitudinal axis during assembly of the screw tip 10 with the screw.

A sealing stop 66 is provided in one end of the screw tip head 36. This provides an engaging limit with a screw (not shown) during assembly to tightly retain the screw tip 10 with the screw and to seal out the melt of material from the connection 12.

Adjacent the guide member 34 (or optionally adjacent the engagement member 32) is the screw tip head 36. A chamfer 38 is formed on one end of the screw tip head 36. The chamfer 38, diameter 42, end of the screw, and cylindrical wall member of the barrel 16 form a flow channel 40 (see FIG. 5 or 6). At least one entry port 44 is provided in the chamfer 38 and body of the screw tip head 36. The mouth of the entry port 44 is disposed in the flow channel 40. The entry port 44, extends at substantially a 45 degree angle from the central longitudinal axis to the central accumulator chamber 46. Alternatively, the entry port 44 may extend at an angle directly to the check valve chamber 48. The entry port 44 is formed by drilling into the body of the screw tip head 36. Preferably, six entry ports are equally spaced about a circumference of the body.

An accumulator chamber 46 is formed about the central longitudinal axis of the screw tip head 36. The accumulator chamber 46 is connected to the at least one entry port 44 and accumulates a melt of material during operation. The accumulator chamber 46 also provides some mixing of the various melt streams from a plurality of entry port 44. The accumulator chamber 46 is formed by drilling, or machining, a bore into the body of the screw tip head 36 about the central longitudinal axis.

A check valve chamber 48 is formed in the end of the screw tip head 36. The check valve chamber 48 is connected to the accumulator chamber 46 and permits a flow of melt to pass from the accumulator chamber 46 to the check valve chamber 48 during operation. The check valve chamber 48 is a substantially cylindrical bore with a sidewall 50. The diameter of the check valve chamber 48 is larger than the diameter of the accumulator chamber 46. A sealing surface 52 is formed in a bottom wall at one end of the cylindrical bore. The bottom wall surrounds the opening of the accumulator chamber 46. The check valve chamber 48 is open on an end of the screw tip head 36 to provide an exit port 54 for the melt of material. The accumulator chamber 46 is formed by machining a bore into the body of the screw tip head 36 about the central longitudinal axis. The accumulator chamber 48 connects to the central accumulator chamber 46. The flow path through the screw tip head includes the entry port 44, the accumulator chamber 46 and the check valve chamber 48. Alternatively, the flow path through the screw tip head 36 includes the entry port 44 and the check valve chamber 48.

The screw tip head 36 is a length and diameter to accommodate the at least one angled entry port 44, the accumulator chamber 46, and check valve chamber 48. A reduced diameter 62 of the screw tip head 36 is provided about the check valve chamber 48. This limits the contact area between the inner sidewall of the barrel 16 and the outer surface of the screw tip head 36 and reduces friction between the screw tip head 36 and the inner sidewall of the barrel 16.

In an embodiment of the invention, the check valve 64 is a substantially cylindrical disk of suitable thickness to withstand injection pressures. The check valve 64 is disposed about the central axis of the body 30 and located within the check valve chamber 48. The diameter of the check valve 64 is such to cover the opening between the accumulator chamber 46 and the check valve chamber 48 and to extend a suitable distance over the sealing surface 52. A surface 72 of the check valve 64 is complimentary to the sealing surface 52 to control a flow of melt during operation from the accumulator chamber 46 to the check valve chamber 48.

The check valve 64 is supported by a plurality of support guides 68, preferably three equally spaced support guides 68. In an embodiment of the invention, the support guides 68 are short dowels or pins that are pressed into openings 70 bored through a thickness of the sidewall 50. The heads of the support guides 68 engage a side surface of the check valve 64 to support and align the check valve 64 about the central horizontal axis while permitting the check valve 64 to move between a flow position and a shut off position. The check valve 64 is illustrated in the open position and is moved aft to the closed position where the sealing surface 52 engages the complimentary surface of the check valve 64.

A stop member 74 is located in the check valve chamber 48 and before the exit port 54. Preferably, the stop member 74 is a pair of long dowels or pins that are pressed into openings 76 bored through a thickness of the sidewall 56 and equally spaced about the check valve chamber 48. An upper surface of the check valve 64 engages the stop member 74 providing a stop for the check valve 64 in the flow position.

Figure 4:
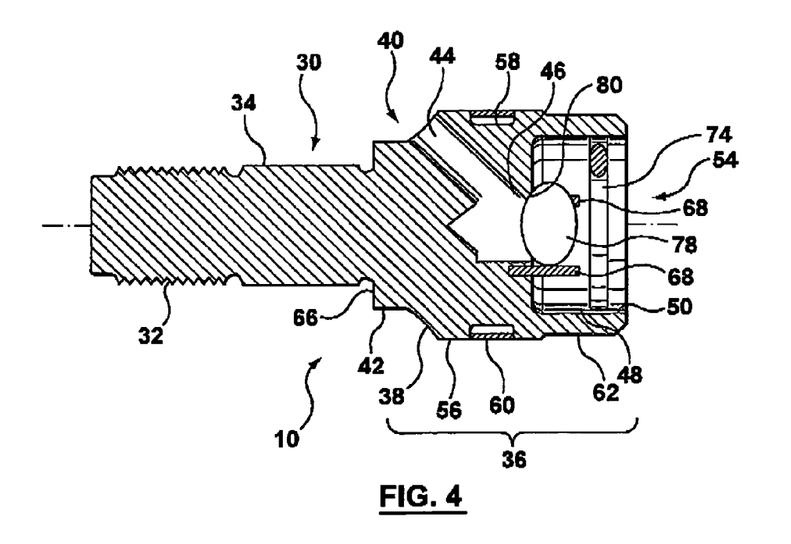
FIG. 4 is a diagrammatic cross sectional view of the screw tip taken along the line A-A from FIG. 2 illustrating an alternative embodiment for the check valve.

Referring now to FIG. 4, an alternative embodiment for the present invention is described. A chamfer portion 80 is formed in the screw tip head 36 intermediate the accumulator chamber 46 and the check valve chamber 48. The chamfer portion 80 provides a sealing surface to a substantially spherical check valve 78. The substantially spherical check valve 78 is supported and guided by the plurality of outwardly extending support guides 68 that are pressed into complimentary bores in the back wall surface of the of the check valve chamber 48. The substantially spherical check valve 78 is illustrated in the shut off position and may be moved forward to the flow position. When in the flow position, the stop members 74 limit the travel of the substantially spherical check valve 78 by contacting the surface of the substantially spherical check valve 78.

Figure 7:
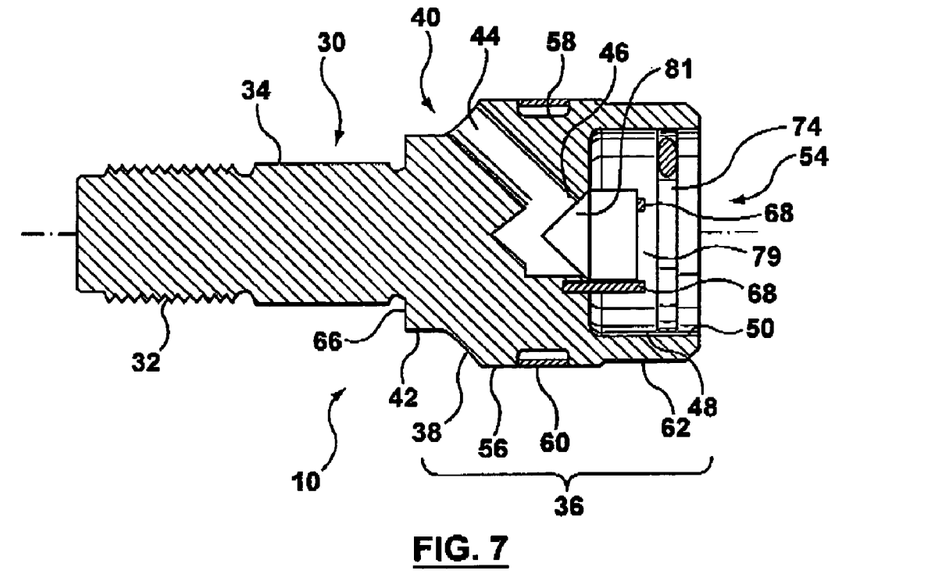
FIG. 7 is a diagrammatic cross sectional view of the screw tip taken along the line A-A from FIG. 2 illustrating an alternative embodiment for the check valve.

Referring now to FIG. 7, another alternative embodiment for the present invention is described. A conical portion 81 is formed in the screw tip head 36 intermediate the accumulator chamber 46 and the check valve chamber 48. The conical portion 81 provides a sealing surface to a substantially conical check valve 79. The substantially conical check valve 79 has a conical section on one end and a cylindrical section on a second end with a flat surface opposite the conical section end. The substantially conical check valve 79 is supported and guided by the plurality of outwardly extending support guides 68 that are pressed into complimentary bores in the back wall surface of the of the check valve chamber 48. The substantially conical check valve 79 is illustrated in the shut off position and may be moved forward to the flow position. When in the flow position, the stop members 74 limit the travel of the substantially conical check valve 79 by contacting the flat surface of the substantially conical check valve 79.

The screw tip 10 is machined from metal material that can withstand the injection molding environment. The screw tip 10 is preferably manufactured separate from the screw 14 and then assembled with the screw 14 by rotating the screw tip 10 about the connection 12 into the screw 14. Alternatively, the screw tip 10 could be manufactured and integral with the screw 14 as a complete part.

The check valves 64 either the cylindrical plate valve or the substantially spherical valve) are preferably stock items. However, they may also be machined from a metal material such as the conical check valve. Assembly requires placing the check valve 64 into the check valve chamber 48. The support guides 68 are then pressed into their respective openings 70 to locate and center the check valve 64 about the horizontal axis. Alternatively, the support guides 68 could be threaded into their respective openings 70. The stop members 74 are then pressed into their respective openings 76. Alternatively, the stop members 74 could be threaded into their respective openings 76. To complete the assembly, the seal 60 is assembled into the groove 58.

Persons skilled in the art will appreciate the shape and configuration of the alternate check valves 64 for use in a plastic molding apparatus should be a shape and configuration that does not create a stagnation point or flow trap with respect to the flow of a melt of plastic material. For example, some plastic resins will degrade and burn in a stagnation or flow trap area. Depending upon the application and resin, this may be undesirable and the shape and configuration of the check valve 64 should avoid stagnation points and flow traps. However, the alternate check valves 64 for use in a metal molding apparatus do not have this limitation as the flow of a melt of metal material will not degrade and burn in a stagnation or flow trap area.

Operation of the screw tip 10 is now described with reference to FIGS. 5 and 6. The screw tip 10 has been assembled to and end of the screw 14 and assembled into the cylindrical lengthwise opening of the barrel 16. This forms an injection unit of a molding system. A barrel head 18 is shown attached to the end of the barrel 16. Alternatively, the barrel head 18 and barrel 16 may be a unitary structure. Forward of the screw tip 10 is an accumulation zone 20 that extends towards a barrel exit port 24. A drive operates the screw 14 for both rotation and translation of the screw 14. The screw 14 is rotated to make and advance a melt of material in the accumulation zone 20. The screw 14 is then translated forward in the barrel 16 to transfer a melt of material out of the accumulation zone 20.

Figure 5:
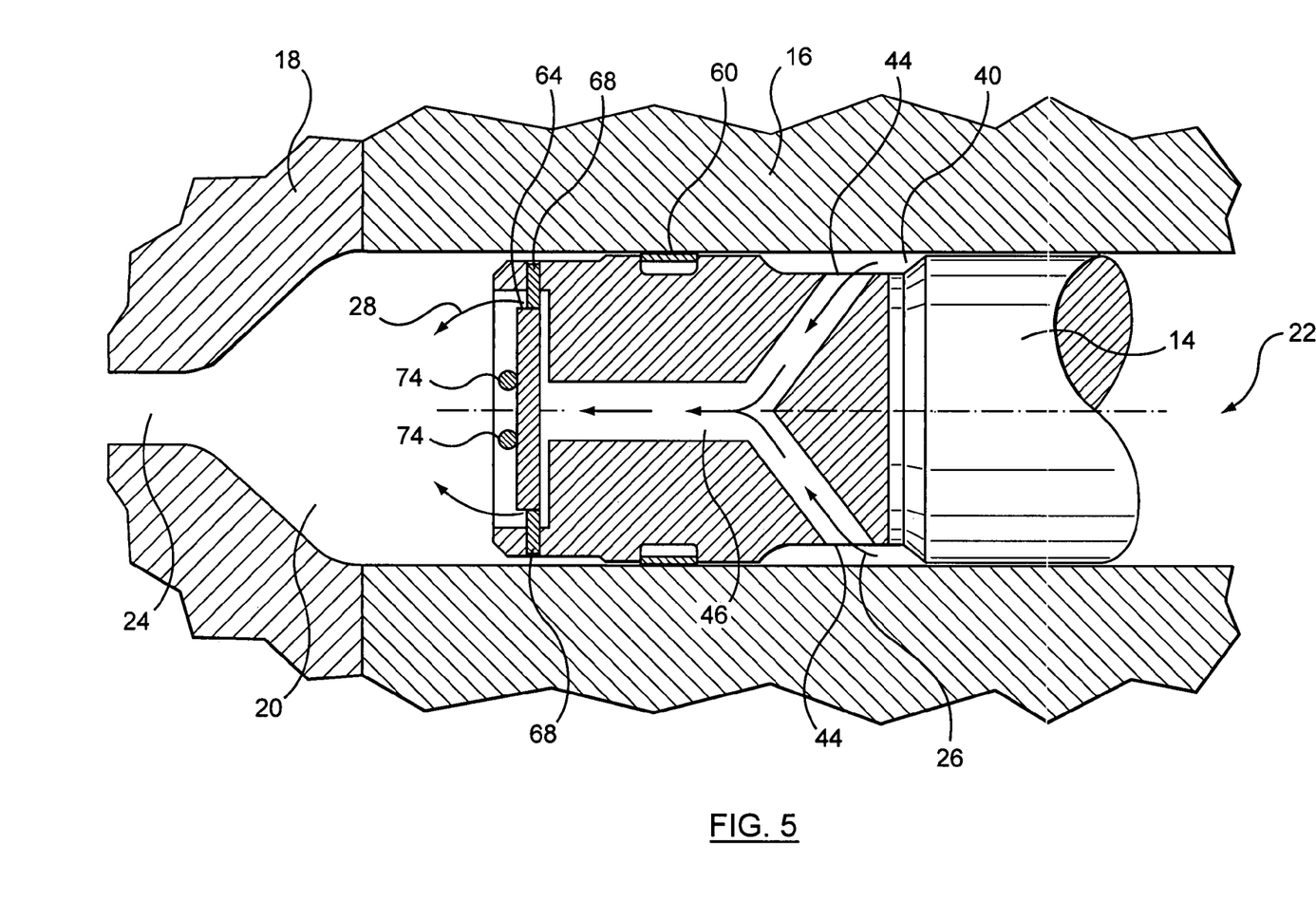
FIG. 5 is a diagrammatic cross sectional view of a barrel assembly illustrating the check valve in a flow position.

Referring now to FIG. 5, the check valve 64 is illustrated in a flow position. As the screw 14 is rotated, a melt of material advances towards the flow channel 40. The melt enters the entry port 44 as an entry flow of melt 26. The entry flow of melt 26 continues forward into the central accumulator chamber 46 where it converges into a single flow of material. The single flow of material acts upon a back surface of the check valve 64, moving the check valve 64 forward on the support guides 68 until the stop member 74 retards the forward motion of the check valve 64. The single flow of material flows around the peripheral edges of the check valve 64 and into the accumulation zone 20 of the barrel 16 through flow paths 28. The screw 14 moves aft as melt continues to accumulate in the accumulation zone 20. This continues until the desired shot of material has been accumulated wherein rotation of the screw 14 is stopped.

Figure 6:
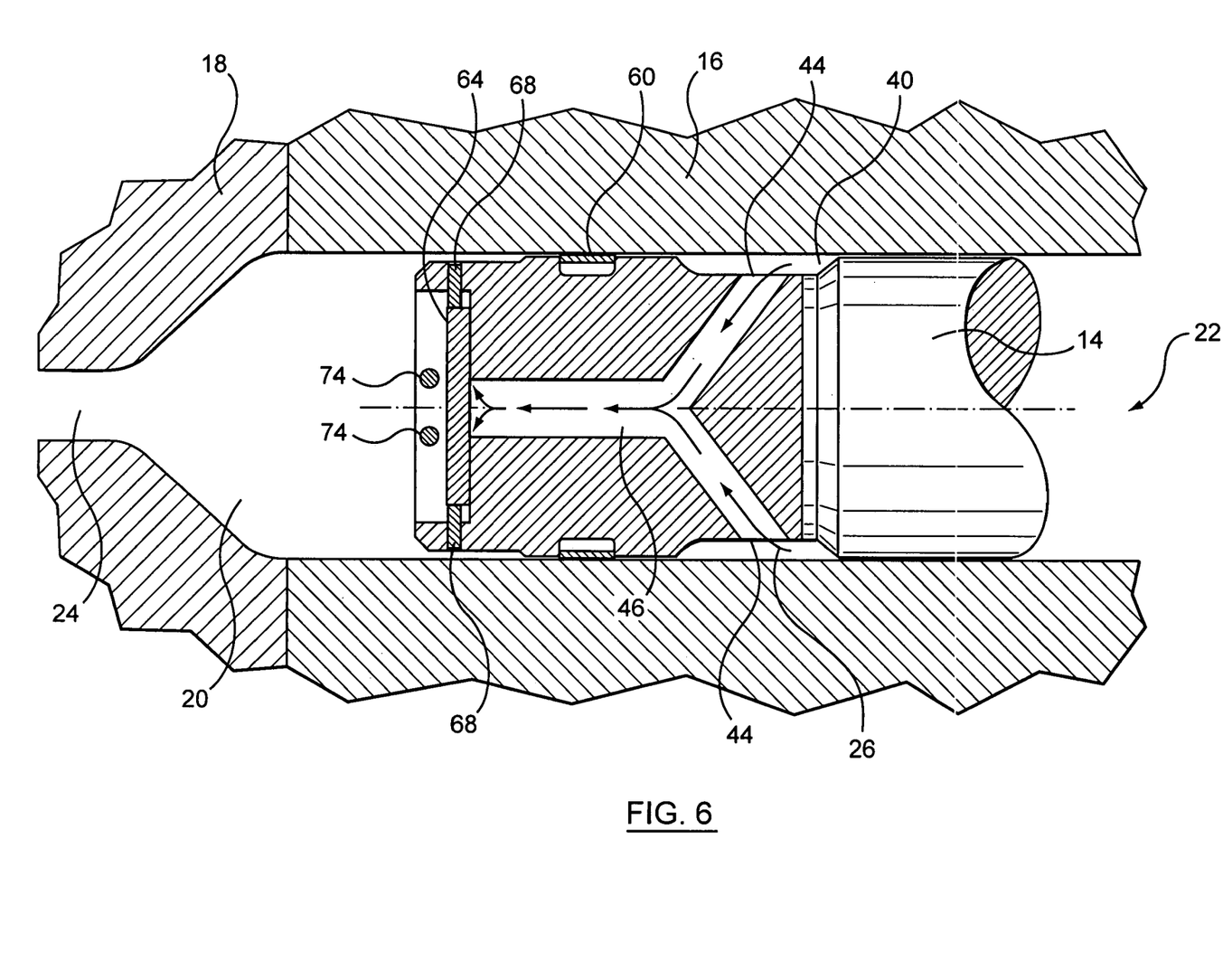
FIG. 6 is a diagrammatic cross sectional view of a barrel assembly illustrating the check valve in a stop flow position.

Referring now to FIG. 6, the check valve 64 is illustrated in a stop flow position. As the screw 14 begins a forward translation to inject the melt of material in the accumulation zone 20, the melt of material in the accumulation zone 20 acts upon a front surface of the check valve 64 and moves the check valve 64 aft until the surface 72 of the check valve 64 engages the sealing surface 52. This prevents any further flow of melt into the accumulation zone 20 and any back flow of material into the central accumulator chamber 46. The screw 14 continues the forward translation which transfers the melt of material out of the accumulation zone 20 through the barrel exit 24 and into a mold.

It will, of course, be understood that the above description has been given by way of example only and that modifications in detail may be made within the scope of the present invention.

NOMENCLATURE FOR THE FIGURES

10—Screw tip
12—Connection
14—Screw
16—Barrel
18—Barrel head
20—Accumulation zone
22—Cylindrical wall
24—Barrel exit
26—Entry flow of melt into screw tip
28—Exit flow of melt out of screw tip
30—Body
32—Engagement member
34—Guide member
36—Screw tip head
38—Chamfer
40—Flow channel
42—Diameter
44—At least one Entry port
46—Central accumulator chamber
48—Check valve chamber
50—Side wall
52—Sealing surface
54—Exit port
56—Support surface
58—Groove
60—Seal
62—Reduce diameter
64—Check value
66—Sealing stop
68—Support
70—Openings
72—Surface
74—Stop member
76—Openings
78—Substantially spherical check valve
80—Chamfer section

What is claimed is:

1. A screw tip for use in a molding system apparatus, said screw tip comprising:
a body,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said support guides cooperating with said body and said translatable member to position said translatable member in said check valve chamber about said axis and permit said translatable member to operate, in use, between said flow position and said shut off position, and
said support guides are three pins equally spaced about a circumference of said check valve chamber, said pins engaging a sidewall area of said translatable member to support and guide movement, in use, of said translatable member.

2. A screw tip for use in a molding system apparatus, said screw tip comprising:
a body,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said support guides cooperating with said body and said translatable member to position said translatable member in said check valve chamber about said axis and permit said translatable member to operate, in use, between said flow position and said shut off position,
a stop member, said stop member cooperating with said body and said translatable member to limit travel, in use, of said translatable member in said check valve in said flow position, and said stop member is a pair of pins equally spaced apart from each other in said check valve chamber for engaging, in use, a surface of said translatable member.

3. A molding system apparatus comprising:
an elongate screw,
a screw tip body,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said support guides cooperating with said body and said translatable member to position said translatable member in said check valve chamber about said axis and permit said translatable member to operate, in use, between said flow position and said shut off position, and
said support guides are three pins equally spaced about a circumference of said check valve chamber, said pins engaging a sidewall area of said translatable member to support and guide movement, in use, of said translatable member.

4. A molding system apparatus comprising:
an elongate screw,
a screw tip body,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said support guides cooperating with said body and said translatable member to position said translatable member in said check valve chamber about said axis and permit said translatable member to operate, in use, between said flow position and said shut off position,
a stop member, said stop member cooperating with said body and said translatable member to limit travel, in use, of said translatable member in said check valve in said flow position, and
said stop member is a pair of pins equally spaced apart from each other in said check valve chamber for engaging, in use, a surface of said translatable member.

5. A molding system apparatus comprising:
a barrel,
an elongate screw, said elongate screw disposed in said barrel and operable, in use, to rotate and translate,
a screw tip body, said screw tip body disposed on an end of said elongate screw,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said support guides cooperating with said body and said translatable member to position said translatable member in said check valve chamber about said axis and permit said translatable member to operate, in use, between said flow position and said shut off position, and
said support guides are three pins equally spaced about a circumference of said check valve chamber, said pins engaging a sidewall area of said translatable member to support and guide movement, in use, of said translatable member.

6. A molding system apparatus comprising:
a barrel,
an elongate screw, said elongate screw disposed in said barrel and operable, in use, to rotate and translate,
a screw tip body, said screw tip body disposed on an end of said elongate screw,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position, wherein said check valve chamber in an end of said body is operable in use to control a flow of material, a plurality of entry ports in said body, wherein said check valve chamber is central in said body about an axis and said plurality of entry ports in said body communicate with said check valve chamber, a translatable member, said translatable member positioned in said check valve chamber about said axis, said support guides cooperating with said body and said translatable member to position said translatable member in said check valve chamber about said axis and permit said translatable member to operate, in use, between said flow position and said shut off position, a stop member, said stop member cooperating with said body and said translatable member to limit travel, in use, of said translatable member in said check valve in said flow position, and said stop member is a pair of pins equally spaced apart from each other in said check valve chamber for engaging, in use, a surface of said translatable member.

7. A screw tip for use in a molding system apparatus, said screw tip comprising:

a body, an entry port in said body, a plurality of support guides, and a check valve chamber in said body, said check valve chamber communicating with said entry port to provide a flow path through said chamber, said check valve chamber having a surface for engaging, in use, a translatable member operable between a flow position and a shut off position, said plurality of support guides intermediate a surface of said chamber and a surface of said translatable member for supporting and guiding, in use, said translatable member between said flow position and said shut off position, wherein said check valve chamber in an end of said bad is operable in use to control a flow of material, a plurality of entry ports in said body, wherein said check valve chamber is central in said body about an axis and said plurality of entry ports in said body communicate with said check valve chamber, a translatable member, said translatable member positioned in said check valve chamber about said axis, said translatable member includes a sealing surface, and said check valve chamber includes a sealing surface, wherein in said shut off position said sealing surface of said translatable member engages said sealing surface of said check valve chamber preventing, in use, a flow of material, said support guides cooperating with said body and said translatable member to position said translatable member in said check valve chamber about said axis and permit said translatable member to operate, in use, between said flow position and said shut off position, and said support guides are three pins equally spaced about a circumference of said check valve chamber, said pins engaging a sidewall area of said translatable member to support and guide movement, in use, of said translatable member.

8. A screw tip for use in a molding system apparatus, said screw tip comprising:

a body, an entry port in said body, a plurality of support guides, and a check valve chamber in said body, said check valve chamber communicating with said entry port to provide a flow path through said chamber, said check valve chamber having a surface for engaging, in use, a translatable member operable between a flow position and a shut off position, said plurality of support guides intermediate a surface of said chamber and a surface of said translatable member for supporting and guiding, in use, said translatable member between said flow position and said shut off position, wherein said check valve chamber in an end of said body is operable in use to control a flow of material, a plurality of entry ports in said body, wherein said check valve chamber is central in said body about an axis and said plurality of entry port in said body communicate with said check valve chamber, a translatable member, said translatable member positioned in said check valve chamber about said axis, said translatable member includes a sealing surface, and said check valve chamber includes a sealing surface, wherein in said shut off position said sealing surface of said translatable member engages said sealing surface of said check valve chamber preventing, in use, a flow of material, said support guides cooperating with said body and said translatable member to position said translatable member in said check valve chamber about said axis and permit said translatable member to operate, in use, between said flow position and said shut off position, a stop member, said stop member cooperating with said body and said translatable member to limit travel, in use, of said translatable member in said check valve in said flow position, and said stop member is a pair of pins equally spaced apart from each other in said check valve chamber for engaging, in use, a surface of said translatable member.

9. A molding system apparatus comprising:

an elongate screw, a screw tip body, an entry port in said body, a plurality of support guides, and a check valve chamber in said body, said check valve chamber communicating with said entry port to provide a flow path through said chamber, said check valve chamber having a surface for engaging, in use, a translatable member operable between a flow position and a shut off position, said plurality of support guides intermediate a surface of said chamber and a surface of said translatable member for supporting and guiding, in use, said translatable member between said flow position and said shut off position, wherein said check valve chamber in an end of said body is operable in use to control a flow of material, a plurality of entry polls in said body, wherein said check valve chamber is central in said body about an axis and said plurality of entry ports in said body communicate with said check valve chamber, a translatable member, said translatable member positioned in said check valve chamber about said axis, said translatable member includes a sealing surface, and said check valve chamber includes a sealing surface, wherein in said shut off position said sealing surface of said translatable member engages said sealing surface of said check valve chamber preventing, in use, a flow of material,
said support guides cooperating with said body and said translatable member to position said translatable member in said check valve chamber about said axis and permit said translatable member to operate, in use, between said flow position and said shut off position, and
said support guides are three pins equally spaced about a circumference of said check valve chamber, said pins engaging a sidewall area of said translatable member to support and guide movement, in use, of said translatable member.

10. A molding system apparatus comprising:
an elongate screw,
a screw tip body,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said translatable member includes a sealing surface, and
said check valve chamber includes a sealing surface,
wherein in said shut off position said sealing surface of said translatable member engages said sealing surface of said check valve chamber preventing, in use, a flow of material,
said support guides cooperating with said body and said translatable member to position said translatable member in said check valve chamber about said axis and permit said translatable member to operate, in use, between said flow position and said shut off position,
a stop member, said stop member cooperating with said body and said translatable member to limit travel, in use, of said translatable member in said check valve in said flow position, and
said stop member is a pair of pins equally spaced apart from each other in said check valve chamber for engaging, in use, a surface of said translatable member.

11. A molding system apparatus comprising:
a barrel,
an elongate screw, said elongate screw disposed in said barrel and operable, in use, to rotate and translate,
a screw tip body, said screw tip body disposed on an end of said elongate screw,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said translatable member includes a sealing surface, and
said check valve chamber includes a sealing surface,
wherein in said shut off position said sealing surface of said translatable member engages said sealing surface of said check valve chamber preventing, in use, a flow of material,
said support guides cooperating with said body and said translatable member to position said translatable member in said check valve chamber about said axis and permit said translatable member to operate, in use, between said flow position and said shut off position, and
said support guides are three pins equally spaced about a circumference of said check valve chamber, said pins engaging a sidewall area of said translatable member to support and guide movement, in use, of said translatable member.

12. A molding system apparatus comprising:
a barrel,
an elongate screw, said elongate screw disposed in said barrel and operable, in use, to rotate and translate,
a screw tip body, said screw tip body disposed on an end of said elongate screw,
an entry port in said body,
a plurality of support guides, and
a check valve chamber in said body,
said check valve chamber communicating with said entry port to provide a flow path through said chamber,
said check valve chamber having a surface for engaging, in use, a translatable member operable between a flow position and a shut off position,
said plurality of support guides intermediate a surface of said chamber and a surface of said translatable member for supporting and guiding, in use, said translatable member between said flow position and said shut off position,
wherein said check valve chamber in an end of said body is operable in use to control a flow of material,
a plurality of entry ports in said body,
wherein said check valve chamber is central in said body about an axis and said plurality of entry ports in said body communicate with said check valve chamber,
a translatable member,
said translatable member positioned in said check valve chamber about said axis,
said translatable member includes a sealing surface, and
said check valve chamber includes a sealing surface, wherein in said shut off position said sealing surface of said translatable member engages said sealing surface of said check valve chamber preventing, in use a flow of material, said support guides cooperating with said body and said translatable member to position said translatable member in said check valve chamber about said axis and permit said translatable member to operate, in use, between said flow position and said shut off position, a stop member, said stop member cooperating with said body and said translatable member to limit travel, in use, of said translatable member in said check valve in said position, and said stop member is a pair of pins equally spaced apart from each other in said check valve chamber for engaging, in use, a surface of said translatable member.

* * * * *